(12) United States Patent
Beltrandi

(10) Patent No.: US 6,401,587 B1
(45) Date of Patent: *Jun. 11, 2002

(54) DEVICE FOR PRODUCING A SCORING LINE IN THE CYLINDRICAL WALL OF A PLASTIC CUP, PARTICULARLY OF A PLASTIC CUP FOR CLOSING A CONTAINER, AND MACHINE USING SAID DEVICE

(75) Inventor: Dario Beltrandi, Imola (IT)

(73) Assignee: Sacmi Cooperativa Meccanici Imola S.c.r.l., Imola (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/541,087

(22) Filed: Mar. 31, 2000

Related U.S. Application Data

(63) Continuation of application No. PCT/EP98/06234, filed on Oct. 1, 1998.

(30) Foreign Application Priority Data

Oct. 7, 1997 (IT) .......................................... BO97A0604

(51) Int. Cl.[7] .............................................. B26D 3/08
(52) U.S. Cl. ........................... 83/879; 83/946; 425/291; 425/809; 53/297
(58) Field of Search ........................... 83/181, 182, 946; 425/291, 809; 264/138; 493/105, 115, 163, 175, 229, 158, 459; 53/296, 297

(56) References Cited

U.S. PATENT DOCUMENTS

| 1,600,632 A | | 9/1926 | Hartsoe | |
| 1,806,475 A | * | 5/1931 | Lee | 53/297 |
| 2,026,780 A | * | 1/1936 | Frostad | 493/105 |
| 2,212,472 A | * | 8/1940 | Hartmann | 83/181 |
| 2,877,496 A | * | 3/1959 | Lamoureux | 83/182 |
| 3,063,237 A | * | 11/1962 | Onulak | 83/182 |
| 4,317,323 A | * | 3/1982 | Richards et al. | 493/105 |
| 5,557,999 A | * | 9/1996 | Smith et al. | 83/880 |
| 5,651,299 A | * | 7/1997 | Boyle et al. | 83/880 |
| 5,658,228 A | | 8/1997 | Kuykendall, Sr. et al. | |
| 5,937,726 A | * | 8/1999 | Spatz et al. | 83/946 |
| 5,964,139 A | * | 10/1999 | Spatz et al. | 83/946 |
| 6,019,592 A | * | 2/2000 | Thakor et al. | 425/566 |

FOREIGN PATENT DOCUMENTS

| DE | A-14 82 603 | 1/1969 |
| EP | A-0 365 823 | 5/1990 |

OTHER PUBLICATIONS

Patent Abstracts of Japan vol. 012, No. 432 (M–763) Nov. 15, 1988 & JP 63 165034 A (Yoshino Kogyosho Co Ltd), Jul. 8, 1988 see abstract.

* cited by examiner

*Primary Examiner*—Kenneth E. Peterson
*Assistant Examiner*—Omar Flores-Sánchez
(74) *Attorney, Agent, or Firm*—Guido Modiano; Albert Josif; Daniel O'Byrne

(57) ABSTRACT

A device for producing a scoring line in the cylindrical wall of a plastic cup, comprising: a mandrel, provided with elements for positioning and retaining a cup applied thereon; a plurality of jaws, an end whereof is articulated to the mandrel so as to oscillate on radial planes; respective circular arc-shaped blades being applied to the opposite end of the jaws and being arranged on a plane which is perpendicular to the axis of the mandrel; actuation elements for the jaws being further provided, as well as elements for actuating the mandrel with respect to the actuation means so as to actuate the arc-shaped blades radially from a position which is external to the cup to a position for engaging the wall of the cup at which the blades form a scoring line in the wall.

13 Claims, 8 Drawing Sheets

DEVICE FOR PRODUCING A SCORING LINE IN THE CYLINDRICAL WALL OF A PLASTIC CUP, PARTICULARLY OF A PLASTIC CUP FOR CLOSING A CONTAINER, AND MACHINE USING SAID DEVICE

CROSS-REFERENCE TO RELATED APPLICATIONS

This application is a continuation of application number PCT/EP98/06234 of Oct. 1, 1998.

BACKGROUND OF THE INVENTION

The present invention relates to a device for producing a scoring line in the cylindrical wall of a plastic cup and to a machine which uses said device. The invention is used in particular in so-called tamper-evident screw caps composed of a cup and of a tamper-evident ring which protrudes from the rim of the cup and in which the scoring line between the wall of the cup and the tamper-evident ring allows to separate the cup from the tamper-evident ring when the cap is unscrewed from the container to which it has been applied.

Machines using devices for producing a scoring line between the cup and the tamper-evident ring in screw caps for closing containers are already known. These devices essentially consist of a circular cutter against which the cap is made to roll so as to produce a scoring line which causes the tamper-evident ring to break away from the cup when the cap is unscrewed from the container. In order to achieve rolling of the cap, the cap is placed over a mandrel which follows a path which is concentrically external to the circular cutter and presses the wall of the cap against the sharp edge of the cutter. Such devices are disclosed for example in EP-533 633 and in U.S. Pat. Nos. 3,824,941, 3,861,551, 4,343,754 and 4,904,435.

A device with the features of the preamble of claim 1 is known from the document DE-A-1 482 603.

Conventional devices entail some substantial drawbacks which can be substantially ascribed to the fact that they are highly sensitive to variations in the external and internal shape of the cup. Moreover, it often happens that the cut is not performed perfectly due to the fact that the cap can slip on the mandrel and thus may not complete its rotation over the cutter.

SUMMARY OF THE INVENTION

The aim of the present invention is to provide a device which allows to obviate the above-mentioned drawbacks of conventional devices.

This aim is achieved with a device for producing a scoring line in the cylindrical wall of a plastic cup, in accordance with the present invention, which has the features set forth in claim 1.

BRIEF DESCRIPTION OF THE DRAWINGS

Further characteristics and advantages of the present invention will become apparent from the following detailed description on the basis of the accompanying drawings, wherein.

DESCRIPTION OF THE PREFERRED EMBODIMENTS

Figure 1:
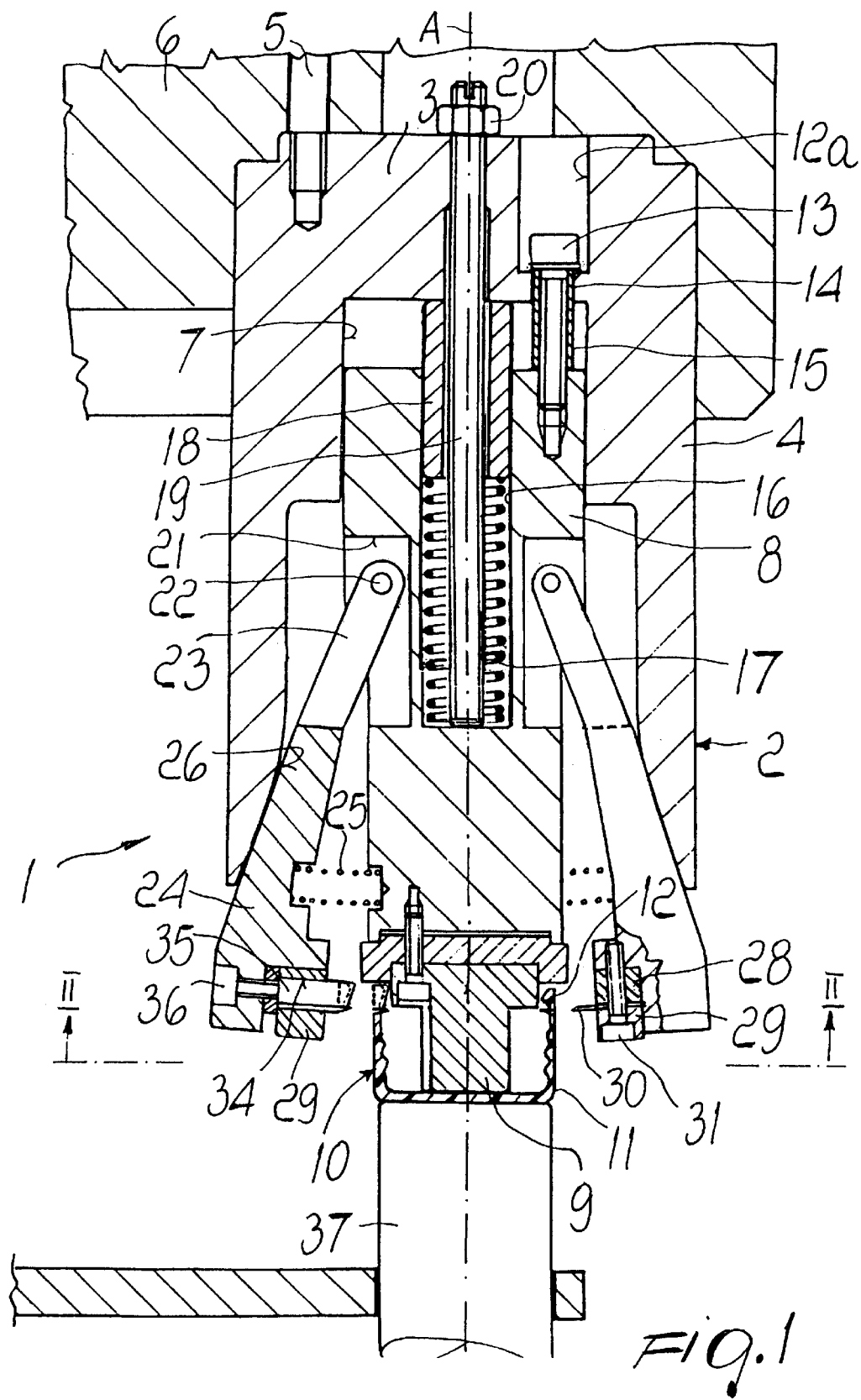
FIG. 1 is a sectional view of a device according to the invention about to produce a scoring line on a screw cap for closing containers.
Figure 2:
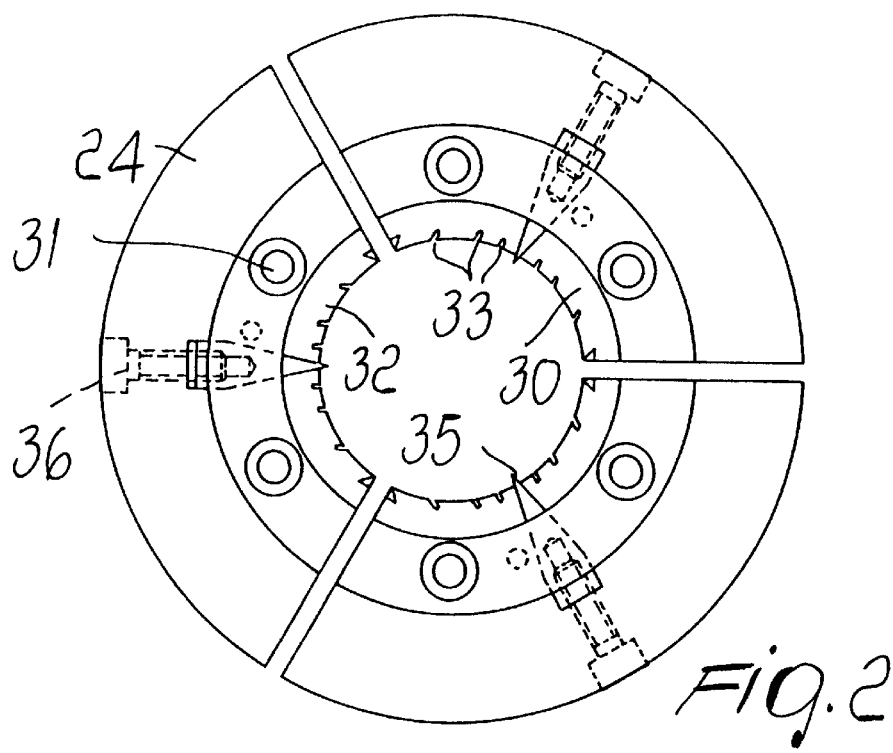
FIG. 2 is a sectional view, taken along the plane II—II of FIG. 1.
Figure 3:
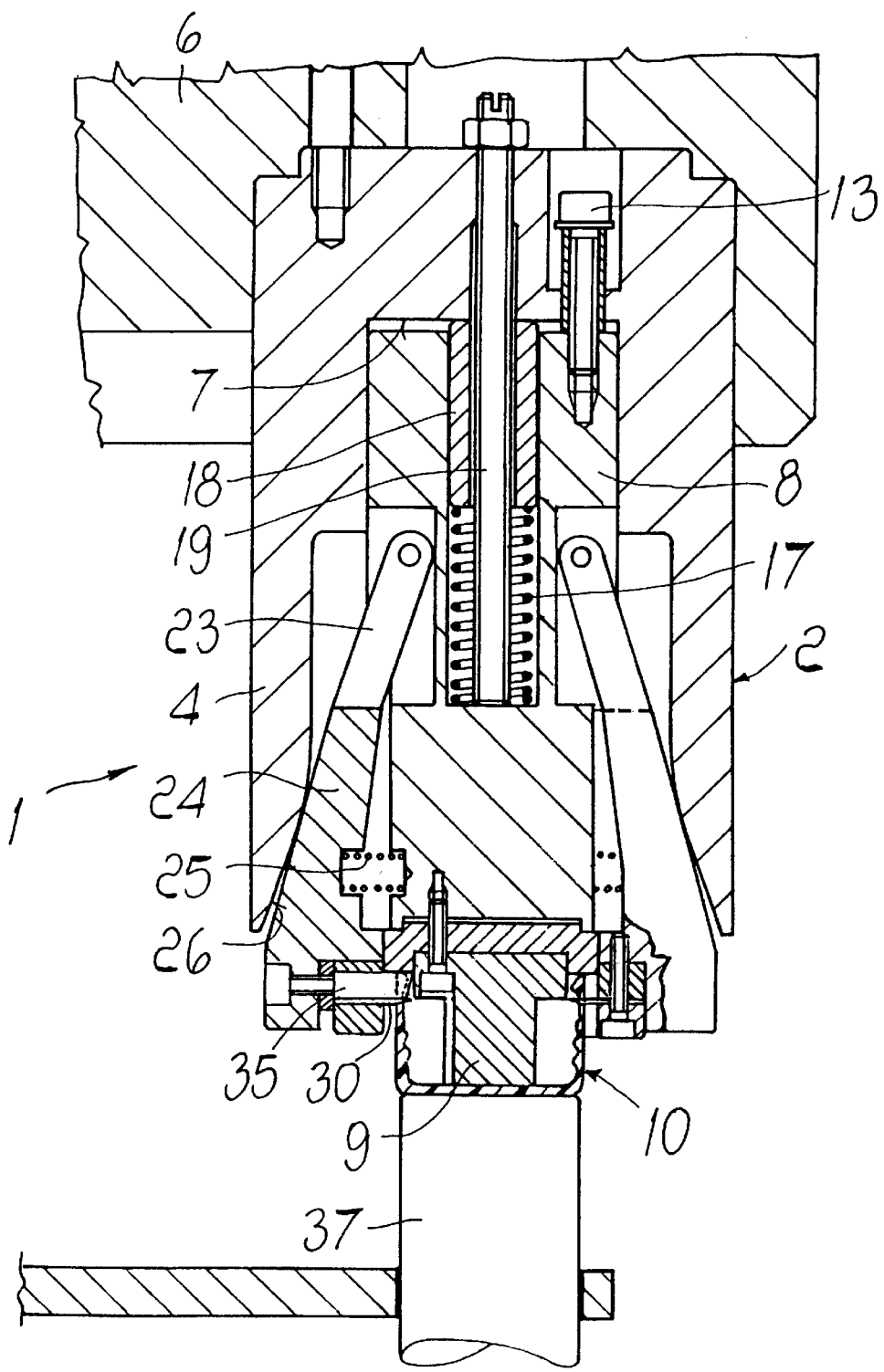
FIG. 3 is a view of the device of the invention in the scoring position.

With reference to FIGS. 1, 2 and 3, the device according to the present invention is generally designated by the reference numeral 1 and is constituted by a cylindrical body 2, termed receptacle hereinafter for the sake of convenience in description, which comprises a bottom 3 and a cylindrical wall 4.

The receptacle 2 is centered and fixed by means of screws 5 to a supporting structure 6 so that its axis A is vertical.

The internal cavity of the receptacle 2 constitutes a seat 7 for the sliding of a cylindrical mandrel 8. At the end of the mandrel 8 that protrudes downward there is provided a shank 9 for the centering of a plastic cap 10 composed of a cup 11 and of a tamper-evident ring 12 which protrudes from the rim of the cup 11. The cup 11 is internally threaded in order to be screwed onto the mouth of a container, and the tamper-evident ring 12 has internal protrusions which, once the cap has been screwed on, engage under an external collar formed below the mouth of the container.

The device 1 allows to form a scoring line between the cup 11 and the tamper-evident ring 12 in order to allow separation of the cup 11 from the tamper-evident ring 12, which is retained by the collar of the container when the cap is unscrewed.

A recess 12a for accommodating a screw 13 is formed in the bottom 3. The screw 13 is screwed into the mandrel 8 through a hole 14 which formed in the bottom of the recess 12a and has a smaller diameter than the head of the screw 13. The head of the screw 13 locks against the mandrel 8 a bush 15 which is guided in the hole 14. In this manner, the mandrel can perform axial strokes, with respect to the receptacle 2, which are limited by the abutment, against the bottom of the recess 12a, of the head of the screw 13, which thus acts as a stroke limiter.

An axial blind hole 16 is formed in the mandrel 8 and is open toward the bottom 3. The hole 16 accommodates a spring 17 which rests against the bottom 3 through the interposition of a spacing bush 18.

A threaded rod 19 is screwed into the bottom 3, inside the receptacle 2, protrudes axially through the bush 18 and the spring 17 and is rotationally locked by means of a nut 20. The rod 19 is suitable to abut against the bottom of the blind hole 16 so as to determine the position of the mandrel inside the seat 7.

Three hollows 21 are formed on the outside of the mandrel and are angularly spaced by 120°. An arm 23 is articulated in each hollow by means of a pivot 22 and a jaw 24 is rigidly coupled thereto. The jaw 24 is constituted by a sector which is substantially conical and has an inclined outer surface which converges toward the bottom of the seat 7.

By means of springs 25 interposed between the jaws 24 and the mandrel 8, the sectors are kept in contact against the internal rim 26 of the wall 4 of the receptacle 2. Conveniently, the internal rim 26 has a chamfer which is complementary to the chamfer of the outer surface of the jaws 24 and is cambered so as to form, together with the jaws, a circumferential contact line.

Each jaw 24 has, in a downward region, an arc-shaped seat 28 in which a block 29 is provided for retaining a blade 30 which is arranged substantially on a plane which is perpendicular to the axis A of the mandrel 8. Two screws 31 pass through the block 29 and the blade 30 and clamp the blade in the seat 28.

Each blade 30, see FIG. 2, has a cutting edge 32 which is shaped like a circular arc whose radius is substantially equal to the radius of the cap 10 and has a plurality of notches 33 having a preset mutual distance. As explained more clearly hereinafter, the blades 30 are meant to cut through the cylindrical wall of the cap so as to separate the tamper-evident ring 12 from the cup 11 except for bridges which join the tamper-evident ring 12 to the cup 11 and are formed by not cutting at the notches 33.

A radial seat 34 is formed in the blocks 29 for locking the blades 30 in a median region, and a cutter 35 is inserted therein. The sharp edge of the cutter lies on a radial plane which passes through the axis A of the mandrel 8 and is aligned with the sharp edge 32 of the respective arc-shaped blade 30.

The cutter 35 is retained in the seat 34 by a screw 36 which is driven from outside through the jaw 24. The cutters 35 are arranged at such a level that when the arc-shaped blades 30 cut the wall of the cap, the cutters 35 cut transversely through the tamper-evident ring.

The described device operates as follows.

In the initial conditions, the mandrel 8 is in a lowered position with respect to the receptacle 2 and the jaws 24 are kept spaced against the internal rim 26 of the receptacle 2 by the springs 25.

The cap 10 to be cut, after being arranged on a lifting device 37, is lifted by the lifting device and centered on the shank 9. As the lifting device 37 continues its upward stroke, the thrust applied against the shank 9 causes the lifting of the mandrel 8 in contrast with the elastic reaction applied by the spring 17.

Through the lifting of the mandrel 8, the jaws 24 abut against the rim 26 and are thus forced to move mutually closer toward the mandrel 8 and cause the engagement of the blades 30 against the wall of the cap 10, thus causing the peripheral cutting of said cap at the level where the tamper-evident ring 12 separates from the cup 11.

The penetration of the blades 30 in the wall of the cap 10 is determined by the abutment of the rod 19 against the bottom of the blind hole 16 and is adjusted by screwing or unscrewing the rod 19 so that the tamper-evident ring 12 remains attached to the cup only at the bridges formed by the notches 33 while, by virtue of the cutters 35, the tamper-evident ring is scored transversely to facilitate its fracture when the cap is removed after being applied to a container.

The described invention is susceptible of numerous modifications and variations.

The number of the blades 30 and of the cutters 35 is chosen according to requirements. For example, it is possible to provide four blades 30 associated with respective jaws, each blade covering an angle of 90°. Moreover, the cutters 35 can also be omitted from the device, for example if the tamper-evident ring, after fracture, must remain attached to the container.

Figure 4:
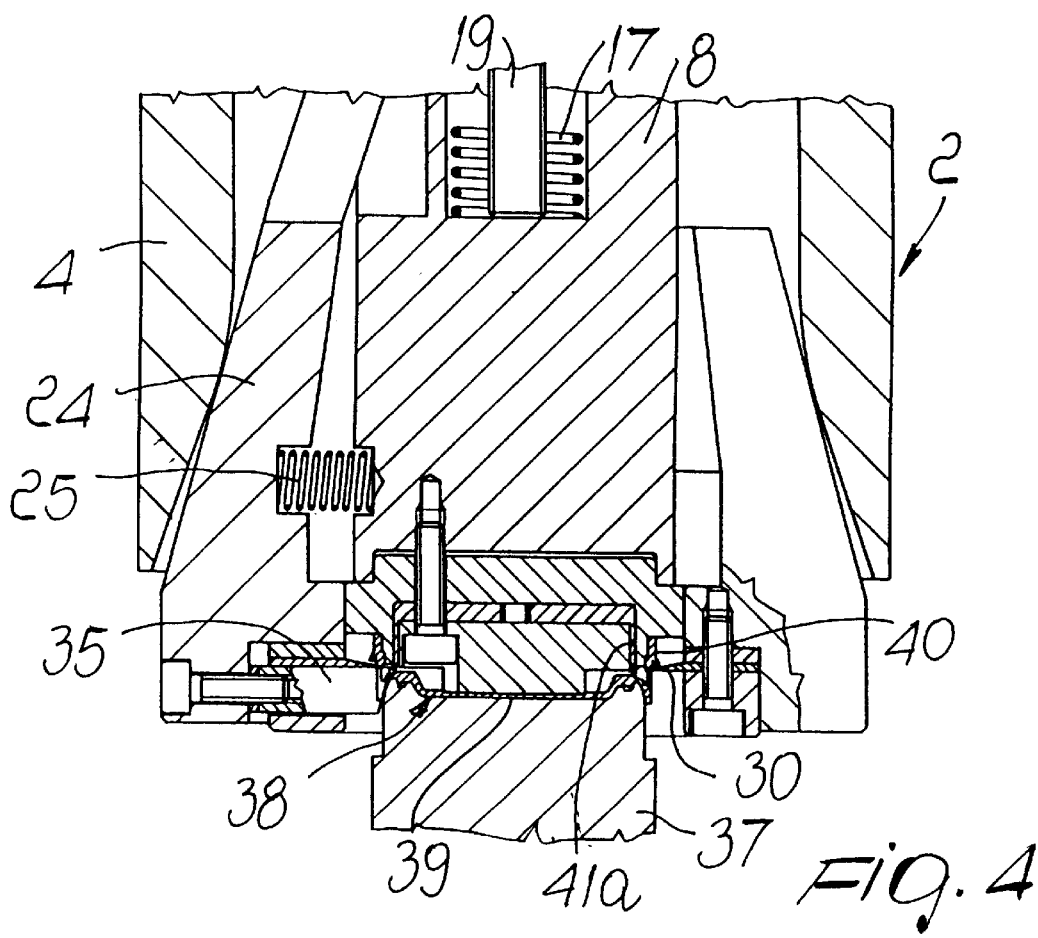
FIG. 4 is a sectional view of a second embodiment of the device.

FIG. 4 is a view of an embodiment of the invention in which the device has been modified to form plastic disks starting from a cup 38 which has a bottom 39 and a cylindrical peripheral wall 40. The difference with respect to the embodiment of the preceding figures is substantially the fact that in the shank 9 of the mandrel 8 there is provided an annular cutter 41a which internally scores the cup along the peripheral region of the bottom 39, so as to separate a disk which can be used as a liner for caps or for other purposes.

Figure 5:
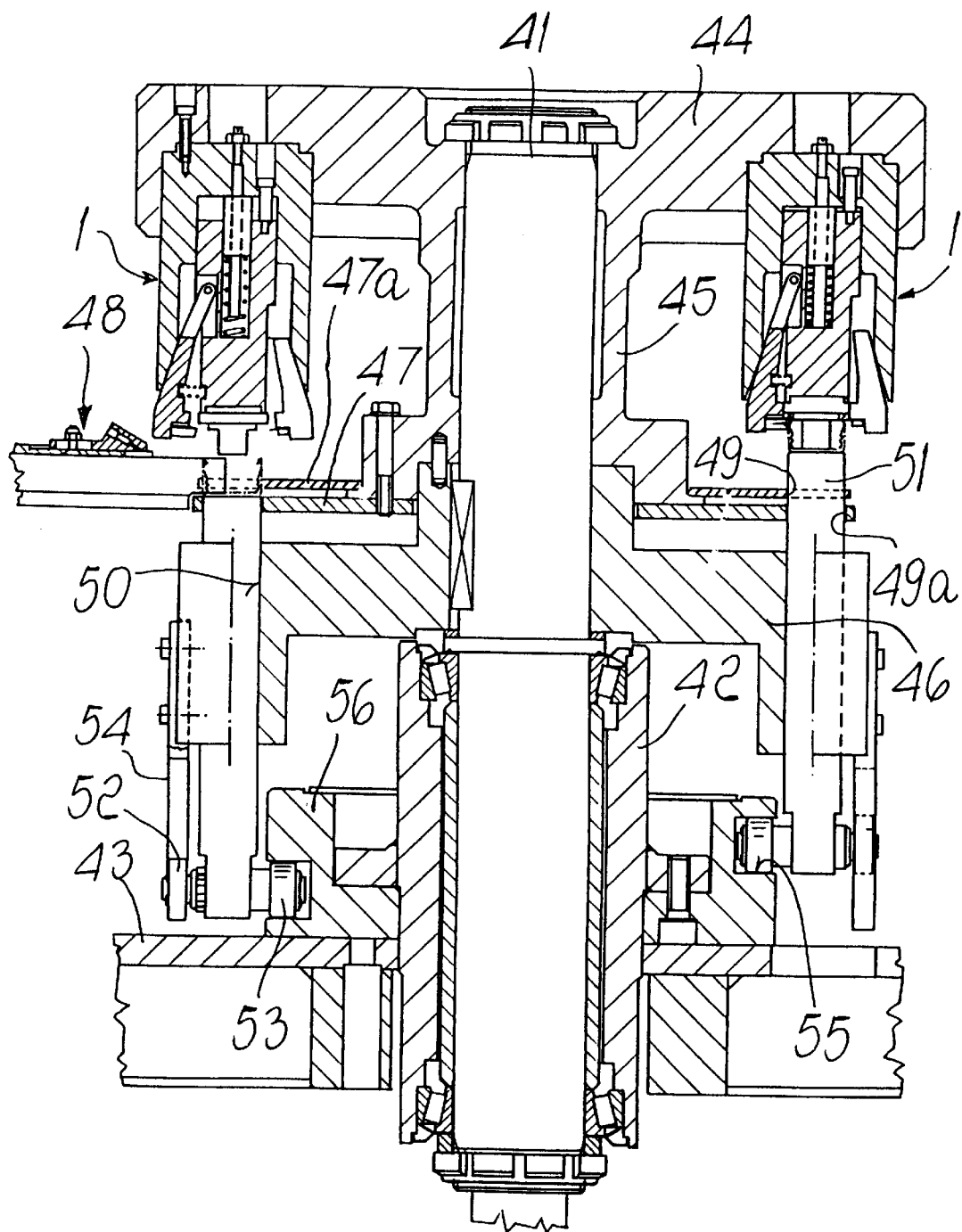
FIG. 5 is a sectional view, taken along a vertical plane, of a machine composed of a plurality of devices arranged in a carousel configuration.

FIG. 5 is a view of an embodiment which comprises a plurality of devices 1 for providing a carousel-like machine.

The machine comprises a vertical shaft 41 which is connected to motor drive means and is rotatably supported in a sleeve 42 which rises from a footing 43. At the top of the shaft 41 there is provided a disk 44 which supports a plurality of devices 1 which are angularly mutually equidistant and are arranged concentrically around the shaft 41.

The disk 44, by means of a sleeve 45, is rotationally rigidly coupled to a flange 46 which is keyed on the shaft 41 above the sleeve 42. A tray 47 is fixed to the sleeve 42 above the flange 46 and is meant to receive the caps arriving from a feeder channel 48. A star element 47a is arranged above the tray 47 and is rigidly coupled thereto. The star element 47a is peripherally provided with seats 49 which are aligned with the respective devices 1 and into which the caps arriving from the channel 48 are transferred. The seats 49 are aligned with openings 49a of the tray 47 and with respective holes 50 which are formed in the flange 46 and are parallel to the shaft 41. Respective bars 51 are guided in the holes 50 and constitute the lifting devices for the caps 10. The bars 51 have, at their lower end, two free rollers 52 and 53 which are diametrically opposite and whose rotation axis is radial with respect to the shaft 41. The outer roller 52 of the two rollers 52,53 engages a vertical guide 54 which is fixed to the peripheral region of the flange 46, protrudes downward and prevents the respective bar from rotating in the seat 50 yet allows it to slide axially.

The internal roller 53 instead engages a slot 55 of an axial cam 56 which is rigidly coupled to the footing and runs around the sleeve 42.

With the described machine, the caps 10, fed in succession from the channel 48 and transferred into the seats 49 of the star element 47a, which rotates in step with the machine, are transferred onto the receiving tray 47 and positioned in the openings 49 that lie above the tops of the bars 51, which are at their lower stroke limit in this step.

As the machine revolves, each lifting device 51, actuated by the cam 56, lifts the respective cap until it abuts against the shank 9. Then, as the lifting of the lifting device continues, the blades 30 close onto the cap 10 and the peripheral scoring is formed as described above with reference to FIG. 1.

When scoring is complete, the lifting device 51 is lowered, allowing the mandrel 8 to follow its movement by means of the spring 17. Simultaneously with the descent of the mandrel 8, the spring 25 disengages the blades 30 from the cap, which once it has been released onto the tray 47 can be removed laterally from the seats by means of conveyor elements.

Figure 6:
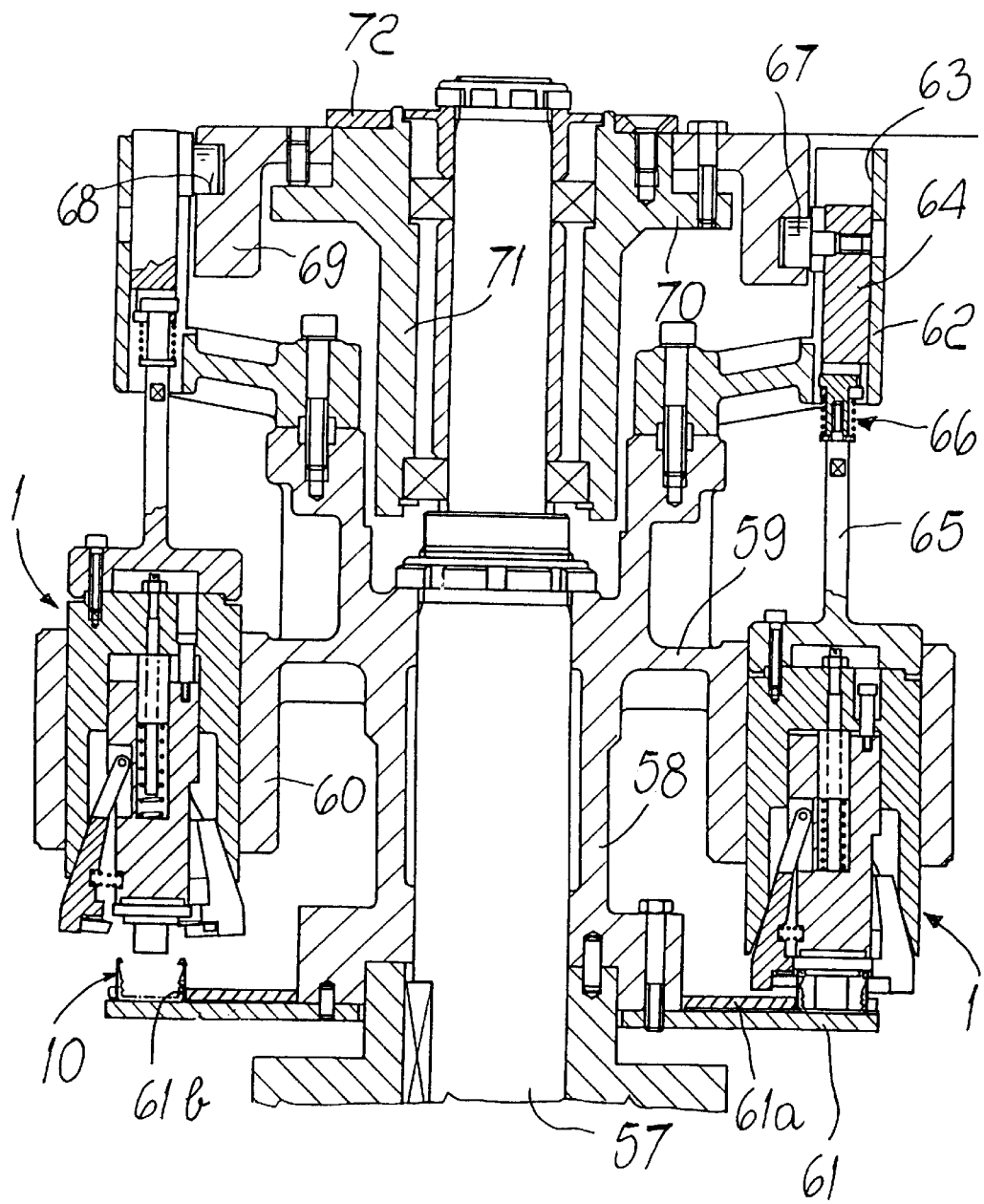
FIG. 6 is a sectional view, taken along a vertical plane, of another carousel-type machine.

FIG. 6 also shows an application of the device for forming a carousel machine which differs from the preceding one in that instead of lifting the cap 10 the devices 1 are lowered.

The machine of FIG. 6 comprises a vertical shaft 57 which is connected to motorization means and is rotatably supported in a footing which is not shown.

A sleeve 58 is keyed onto the shaft 57 and is provided with a flange 59 in which a plurality of bushes 60 is provided which are angularly equidistant around the shaft 57. The receptacles 2 of respective devices 1 can slide in the bushes 60. The tray 61 for receiving the caps is fixed to the lower end of the sleeve 58 together with the corresponding star 61a, which is provided with seats 61 into which the caps 10 are transferred by a feeder channel which is similar to the one designated by the reference numeral 48 in the embodiment of the machine shown in FIG. 5.

A sort of drum 62 is fixed to the upper end of the sleeve 58 and is provided with axial guides 63 which are aligned with the bushes 60. Respective sliding blocks 64 can slide in the guides 63 and are connected to the receptacles 2 of the respective devices 1 by means of rods 65. Conveniently, flexible couplings 66 are provided between the rods 65 and the sliding blocks 64 to allow small mutual movements.

Respective free rollers 67 protrude inward from the sliding blocks 64 and engage the slot 68 of an axial cam 69 which is centered and fixed on the collar 70 of a sleeve 71 in which the upper portion of the shaft 57 is rotatably supported. The sleeve 71 and therefore the cam 69 are caused to be stationary with respect to the shaft 57 by means of a bracket-like connection 72 to the frame of the machine.

It is evident from FIG. 6 that as the shaft 57 revolves, the cam 69 actuates the sequential descent of the devices 1, so that the shanks of the mandrels 8 engage the respective caps 10 to be scored.

When the shank 9 of one device has made contact against the bottom of the respective cap, the cam 69 actuates the further descent of the device which causes the movement of the mandrel 8 with respect to the receptacle 2, consequently closing the jaws 24 and perimetrically scoring the cap.

As the machine continues its rotation, the cam 69 actuates the lifting of the device 10, so that the spring 17 can push out the mandrel 8 again, allowing the jaws 24 to open and allowing the blades to disengage from the cap, which can thus be left on the tray 61 for removal.

Figure 7:
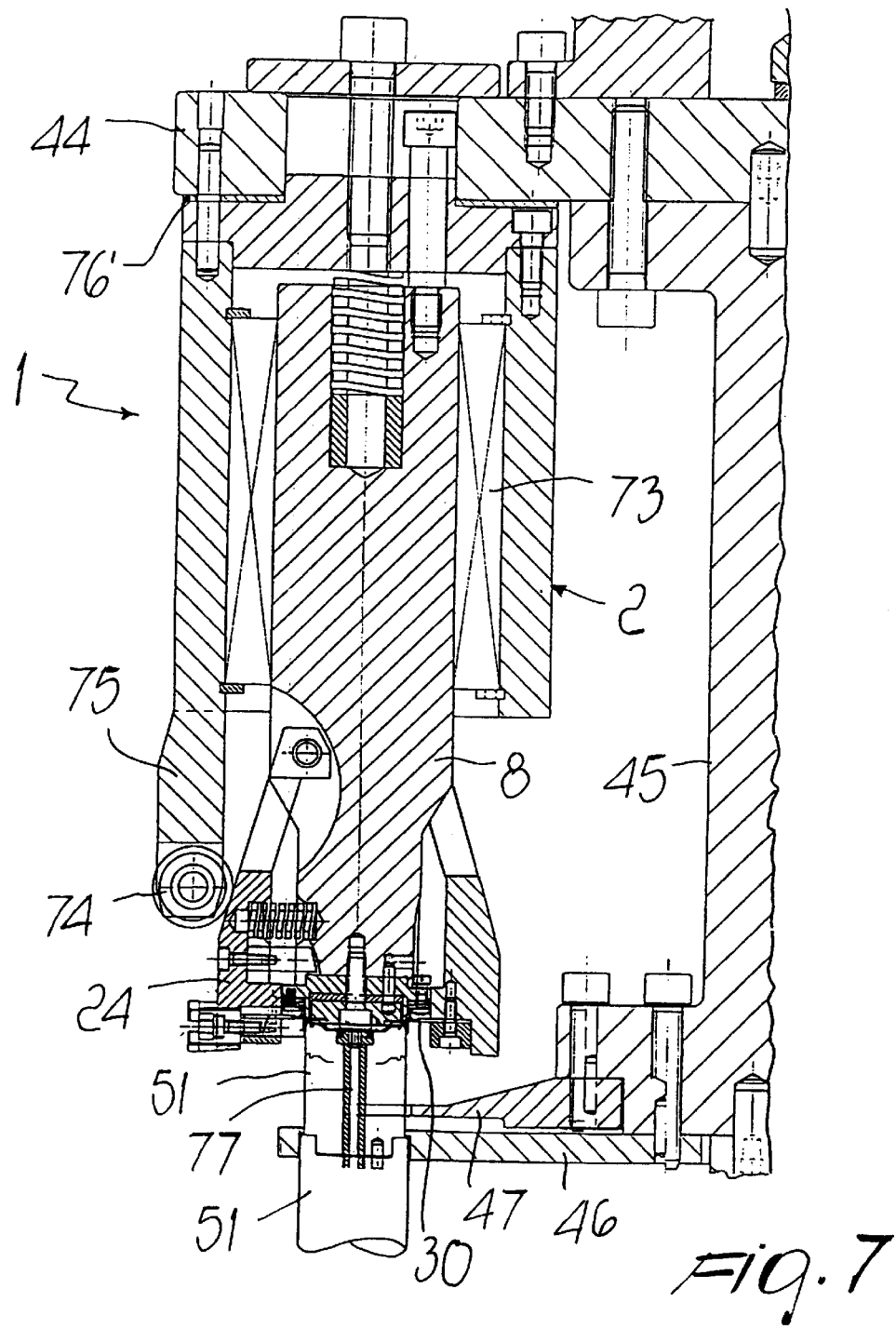
FIG. 7 is a view of a further embodiment of the device applied to a machine of the type shown in FIG. 5.

FIG. 7 illustrates a further embodiment of a machine of the type shown in FIG. 5 but provided with devices 1 such as the one of FIG. 4 for forming plastic disks. The machine of FIG. 7 can of course be used also to score caps for closing containers.

With respect to the preceding devices, the differences of the embodiment of FIG. 7 aim to reduce friction and consist of the fact that the mandrel 8 is guided in the receptacle 2 by means of a sleeve-shaped ball bearing 73 and in that in order to actuate the jaws 24 bearings 74 are provided which are supported in extensions 75 of the wall 4 and in contact with the conical outer surface of the jaws 24.

Advantageously, instead of the threaded rod 19 there is provided an adaptable shim 76 which allows to adjust the level at which the blades 30 act. Finally, the reference numeral 77 designates a duct which leads onto the supporting surface of the cup 38 and is connected to a source of suction in order to retain the disks on the top of the bars 51.

Figure 8:
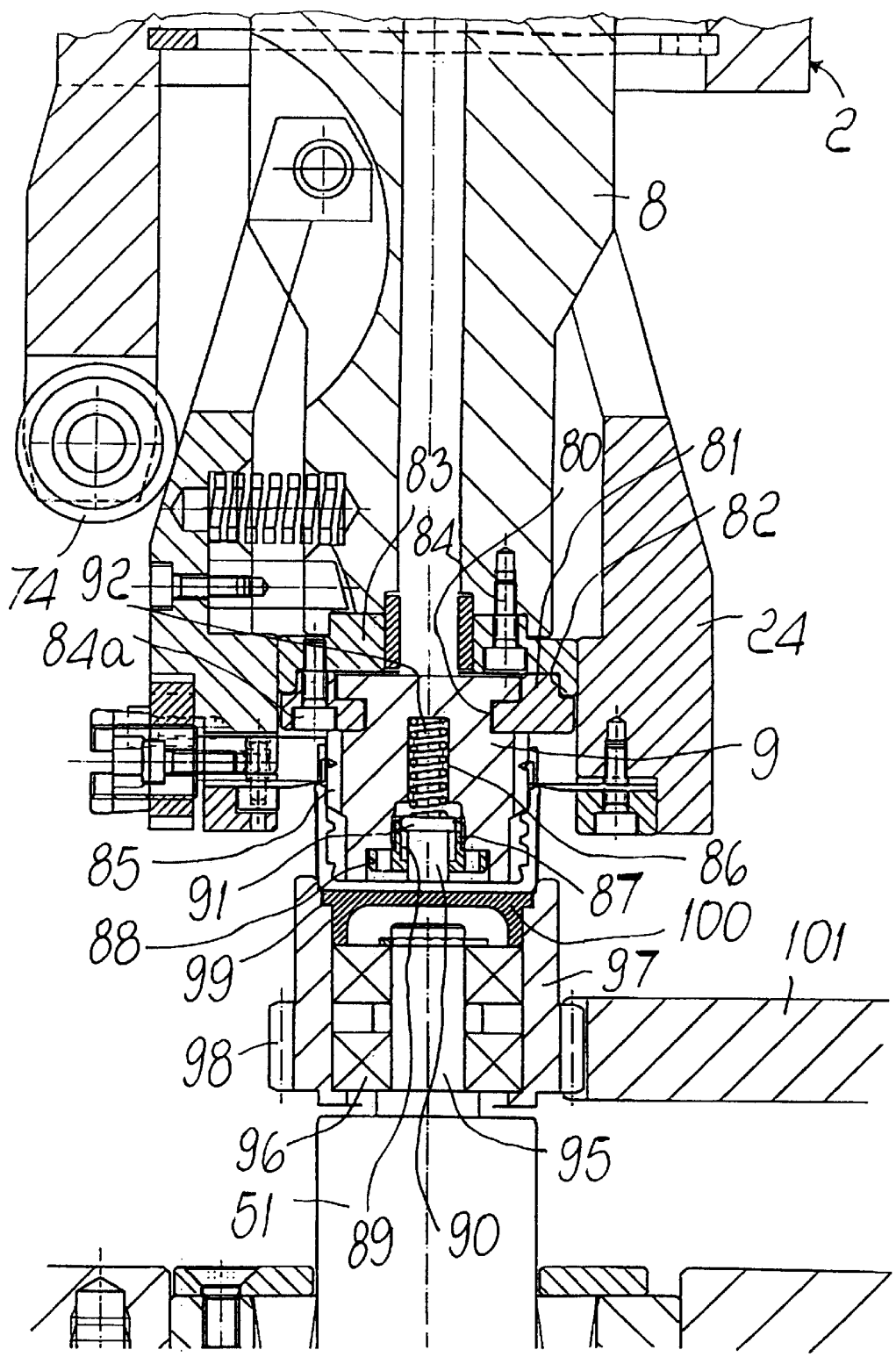
FIG. 8 is a view of another embodiment of the device applied to a machine of the type shown in FIG. 5.
Figure 9:
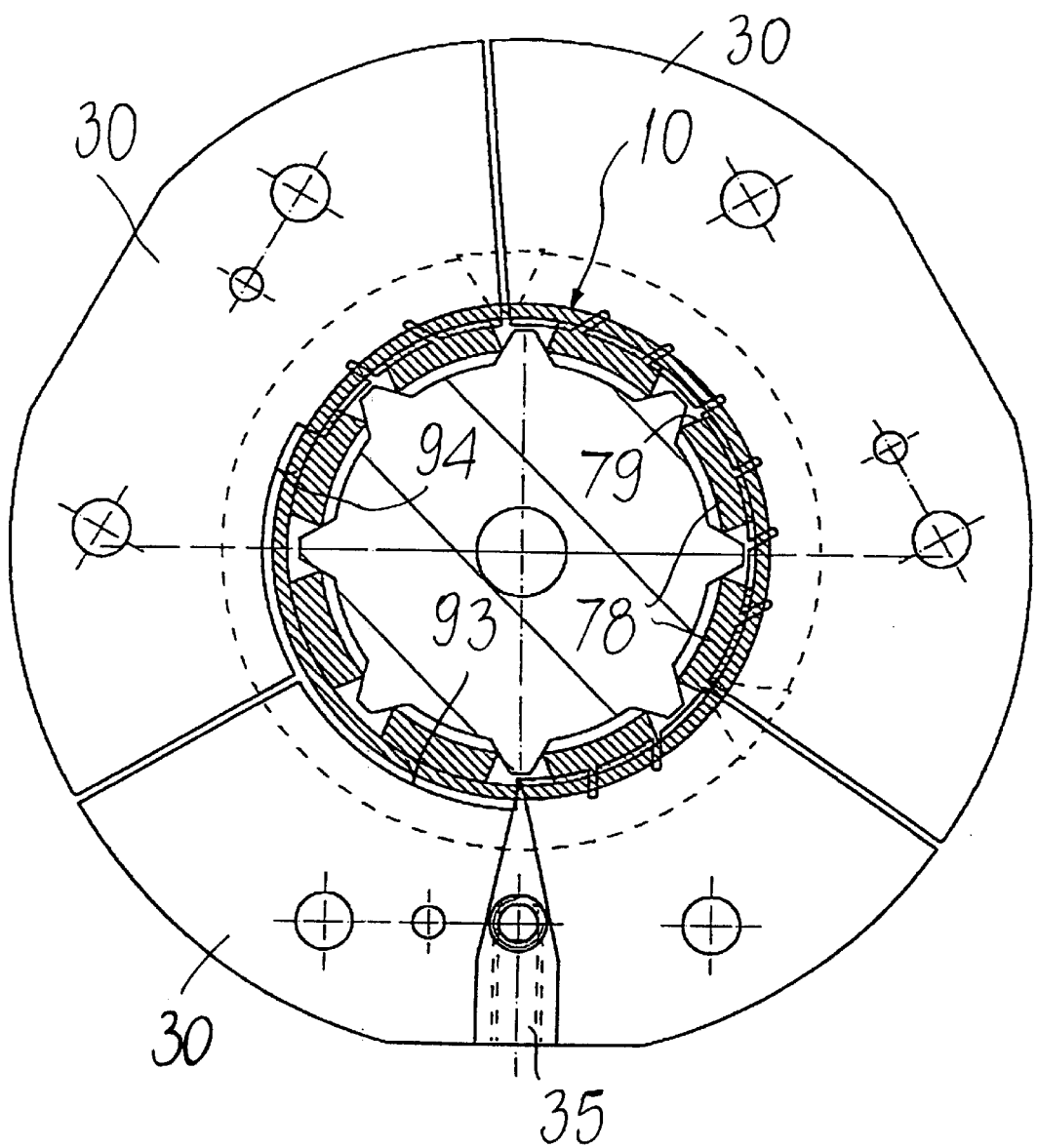
FIG. 9 is a sectional view, taken along the plane IX—IX of FIG. 8.

Another embodiment of the machine of FIG. 5 is shown in FIGS. 8 and 9 and allows, for each device, to determine the angular position of the cap 10 with respect to a cutter 35 (see FIG. 9).

This requirement arises in the case of caps 10 in which the tamper-evident ring 12 is provided with internal flaps 78 which are separated by gaps 79 and must remain attached to the cup 11 after fracture along the scoring lines, formed by the blades 30 and by the cutters 35, when the cap 10 is unscrewed from the container. This is done to avoid having to remove, with a subsequent operation, the tamper-evident ring which has remained attached to the neck of the container or for materials recycling reasons, since the material of the cap is different from the material of the container.

In the embodiment of FIGS. 8 and 9, the shank 9 has a peripheral groove 80 in which circular sectors 81 engage; said sectors are centered in a seat 82 of a disk 83 which is fixed to the lower end of the mandrel 8 by means of screws 84.

The sectors 81 are crossed by fixing screws 84a which are screwed into the disk 83.

The shank 9 has an external set of teeth 85 whose angular distance is equal to the distance of the gaps 79 between the flaps 78 of the cap 10. Moreover, in the shank 9 there is provided a blind hole 86 having a threaded portion in which a ring 87 is screwed. The ring 87 has a flange 88 whereby it is locked against a shoulder of the hole 86 and an axial seat 89 in which a pivot 90 provided with a collar 91 is guided. A spring 92 acts on the pivot 90 and, by abutting against the bottom of the hole 86, keeps the collar 91 in contact against an internal abutment of the bush 87.

When the collar 91 rests on the internal abutment of the ring 87, the end of the pivot 90 protrudes axially out of the shank 9.

The angular arrangement of the teeth 85 and their shape is such as to allow them to enter the gaps 79 when the cap is fitted over the shank 9.

In order to ensure that the tamper-evident ring 12 remains attached to the cup 11 also after the cap has been removed from the container, some portions 93, 94 of two adjacent blades 30 are removed so that the wall of the cap that lies in front of them remains intact. The tamper-evident ring 12 is opened by forming a single transverse scoring line with a single cutter 35 arranged at one end of the portion 93. In this manner, when the cap is unscrewed from the container, the tamper-evident ring can break starting from the position of the cutter 35.

In order to position each cap 10 on the respective shank 9 in the intended angular position with respect to the cutter 35, at the top of the corresponding bar 51 there is provided a coaxial pivot 95 which supports, by means of bearings 96, a bush 97 provided with an external set of teeth 98. At the top of the bush 97 a seat 99 is provided for accommodating a tray 100 which constitutes a supporting base for a cap 10.

Through the actuation of the bar 51 by the cam 56, the bush 97 is raised from a lowered position for receiving a cap on the tray 100 to a position for engaging the shank 9.

In order to allow the teeth 85 of the shank 9 to enter the gaps 79 between the flaps 78, the set of teeth 98, during the upward stroke of the bush 97, is made to mesh with an actuation element which is capable of making the bush 97 rotate. The actuation element is constituted, for example, by a ring 101 with internal teeth which is fixed to the outside of the devices 1. The profiles of the teeth 98 are shaped so as to avoid violent impacts when meshing with the teeth 85 occurs. In a further embodiment, the actuation element is constituted by a gear which is rotatably supported on the central shaft 41 and meshes constantly with the set of teeth 85 of the bush 97. The wheel is controlled by an actuation cam whose profile is such as to make the bush 97 rotate gradually.

By means of the machine of FIGS. 8 and 9, in a first step of the lifting action a relative rotation occurs between the cap 10 and the bush 97 until the teeth 85 engage the gaps 79, while in a second step of the lifting action, as a consequence of the relative movement between the jaws 24 and the receptacle 2, the tamper-evident ring is scored peripherally and transversely.

By means of the descent stroke, the pivot 90, by means of the thrust applied by the spring 92, causes the separation of the cap from the shank 9 and its deposition on the tray 100.

What is claimed is:

1. A device for producing a scoring line in the cylindrical wall of a plastic cap for closing a container composed of a cup and of a tamper-evident ring which protrudes from the rim of the cup, comprising: a supporting structure; a cup retaining mandrel supported at said supporting structure so as to perform axial strokes, between lowered and lifted positions, along a longitudinal axis thereof, with respect to said supporting structure; a shank provided rigidly connected at lower end of said mandrel to act as a retainig means for positioning and retaining a cup applied thereon; a plurality of jaws, articulated so as to oscillate on planes which lie radially with respect to a longitudinal axis of said mandrel; respective circular arc-shaped blades being applied to said jaws and being arranged on a plane which is perpendicular to said axis of said mandrel; jaw actuation means for said jaws being further provided so as to actuate said arc-shaped blades radially from a position which is external to said cup, corresponding to said lowered position of said mandrel, to a position for engaging the cylindrical wall of said cup, corresponding to said lifted position of said mandrel, at which said blades form a scoring line in said wall, said jaws being articulated at a first end thereof at said mandrel, and said arc-shaped blades being applied at the opposite end of the jaws; and a lifting device actable to move towards, and center on said shank, provided at the lower end of the mandrel, while in said lowered position, a cap on which a scoring line has to be formed, and to further cause a sliding motion of said shank and mandrel to said lifted position, with the cap retained thereon, along said longitudinal axis and with respect to said jaw actuation means, said mandrel motion to said lifted position enabling said jaw actuation means to provide oscillation of said jaws and actuation of said arc-shaped blades.

2. The device according to claim 1, wherein said jaw actuation means are constituted by a receptacle element which forms a seat for the sliding of said mandrel, said receptacle element having a rim which acts as an abutment for said jaws, so as to actuate the radial movement of said blades when said mandrel is actuated with respect to said receptacle element, said jaws being constituted by sectors whose outer surface is substantially conical, springs being arranged between said mandrel and said jaws and being suitable to keep the conical outer surface of said jaws in contact against the rim of said receptacle element.

3. The device according to claim 1, wherein said jaw actuation means are. constituted by a receptacle element which forms a seat for the sliding of said mandrel, said receptacle element having a wall in which bearings are supported which lie on planes which are radial with respect to the axis of said mandrel, said jaws being constituted by sectors whose outer surface is substantially conical and in contact with said bearings, so as to actuate the radial movement of said blades when said mandrel is actuated with respect to said receptacle element, springs being arranged between said mandrel and said jaws, said springs being suitable to keep the conical outer surface of said jaws rested against said bearings.

4. The device according to claim 1, wherein each one of said jaws has a seat for accommodating a block for fixing a blade.

5. The device according to claim 4, wherein said block has a seat for a cutter whose sharp edge lies on a plane which is radial with respect to said mandrel, is aligned with the cutting edge of said blades and is suitable to score said tamper-evident ring transversely.

6. The device according to claim 5, wherein the cutting edge of said blades has notches which are suitable to form bridges for joining the temper-evident ring to the cup after forming the scoring line.

7. A The device of claim 1, wherein said shank for positioning and retaining said cup has an annular cutter suitable to cut the bottom of said cup.

8. A machine for forming score lines on plastic caps comprising:

a vertical shaft which is rotationally actuated;

a disk, rigidly coupled to the top of said shaft to rotate therewith a plurality of scoring devices supported on said disk so as to be arranged concentrically and angularly equidistant around said shaft for producing scoring lines on cylindrical wails of plastic caps, each one of said scoring devices including: a supporting structure; a cap retaining mandrel supported at said supporting structure so as to perform axial strokes between lowered and lifted positions, along a longitudinal axis thereof, with respect to said supporting structure; a shank provided rigidly connected at lower end of said mandrel to act as a retaining means for positioning and retaining a cap applied thereon; a plurality of jaws, articulated so as to oscillate on planes lying radially with respect to a longitudinal axis of said mandrel; respective circular arc-shaped blades applied to said jaws and arranged on a plane which is perpendicular to said axis of the mandrel; jaw actuation means for moving said arc-shaped blades radially from a position which is external to said cap, corresponding to said lowered position of said mandrel, to a position for engaging the cylindrical wall of said cap, corresponding to said lifted position of said mandrel, at which said blades form a scoring line in said wall, said jaws being articled at a end thereof at said mandrel, and said arc-shaped blades being applied at the opposite end of the jaws; and a lifting device actuatable to move towards, and center on said shank, provided at the lower end of the mandrel, while in said lowered position, a cap on which a scoring line has to be formed, and to further cause a sliding motion of said shank and mandrel to said lifted position, with the cap retained thereon, along said longitudinal axis and with respect to said jaw actuation means, said mandrel motion to said lifted position enabling said jaw actuation means to provide oscillation of said jaws and actuation of said arc-shaped blades;

a tray for receiving the caps, which is rotationally rigidly coupled to said shaft below said scoring devices;

a flange arranged below said tray so as to rotate jointly with said shaft;

a plurality of seats and openings which are formed in said flange and in said tray respectively, said seats and openings being vertically aligned with respective ones of said scoring devices, with respective lifting devices thereof being guided in said seats and said openings;

an axial cam which is arranged in a stationary configuration around said shaft to actuate said lifting devices, in succession, so as to pew an active stroke and a return stroke between a lowered position and a raised position, said active stroke being suitable to cause the lifting of the caps from said receiving tray, centering thereof on respective ones of said mandrels, lifting of the mandrels and action of the blades to produce a scoring line around the cap, and said return stroke being suitable to cause deposition of the cut caps onto said receiving tray.

9. The machine of claim 8, wherein said shank has an external set of teeth composed of teeth being so shaped and arranged at angular distances such as to allow engagement of the teeth in gaps of a tamper-evident ring formed by flaps which protrude inside the cap.

10. The machine of claim 9, wherein said arc-shaped blades have cutting edges provided with notches shaped as to form bridges for joining the tamper-evident-ring to the cap after forming of said scoring lines.

11. The machine of claim 9, further comprising a bush arranged for rotation at a top end of each one of said lifting devices, said bush being provided with a seat for positioning a cap; bush actuation elements for actuating in rotation said bush, during the fitting of said cap over said shank, so as to determine an angular positioning of said cap with respect to said shank and engagement of the external set of teeth of said shank in said gaps.

12. The machine of claim 11, wherein said bush actuation elements are constituted by a set of teeth and an actuation gear, said set of teeth being formed externally to said bush for engagement with said actuation gear.

13. A machine for forming scoring lines on plastic caps comprising:

a vertical shaft which is rotationally actuated about a vertical axis thereof;

a flange, rigidly supported on said shaft so as to rotate jointly therewith, and provided with a plurality of bushes arranged concentrically and angularly equidistant around said shaft with a vertical axes thereof oriented parallel to the axis of said shaft;

a plurality of scoring devices, each of which being guided for sliding motion within a respective one of said bushes and including: a cap retaining mandrel provided with retaining means for positioning and retaining a cap thereon; a plurality of jaws, articulated so as to oscillate on planes lying radially with respect to a longitudinal axis of said mandrel; respective circular arc-shaped blades applied to said jaws and arranged on a plane which is perpendicular to said axis of the mandrel; a jaw actuation means for moving said arc-shaped blades radially from a position which is external to said cap to a position for engaging the cylindrical wall of said cap at which said blades form a scoring line in said wall, said jaws being articulated at a first end thereof at said mandrel, and said arc-shaped blades being applied at the opposite end of the jaws; the sliding motion of the scoring device enabling said jaw actuation means to abut on said jaws so as to provide oscillation thereof and actuation of said arc-shaped blades;

a tray for receiving the caps, which is arranged below said scoring devices and rotates jointly with said shaft;

a drum which is fixed to said shaft to rotate jointly therewith and is provided with a plurality of sliding guides, each one of said guides being aligned with a corresponding one of said bushes;

a plurality of sliding blocks each of which being mounted for sliding motion in a corresponding one of said guides and being operatively connected to a respective one of said scoring devices, an axial cam mounted stationary around said shaft for actuating said sliding blocks to move in succession so as to perform an active stroke and a return stroke between a lowered position and a raised position, said active stroke being suitable to determine lowering of said scoring devices for centering of said mandrels on the respective caps arranged on said receiving tray, and actuation of the blades to produce the scoring lines around the caps, and said return stroke being suitable to cause lifting of said scoring devices and disengagement of said mandrels from said caps.

\* \* \* \* \*